(12) United States Patent
Dutta et al.

(10) Patent No.: US 8,677,316 B2
(45) Date of Patent: Mar. 18, 2014

(54) ENFORCEMENT OF ARCHITECTURAL DESIGN DURING SOFTWARE DEVELOPMENT

(75) Inventors: Suhail Dutta, Kirkland, WA (US); David N Trowbridge, Enumclaw, WA (US); Bernard Tschirren, Seattle, WA (US); Arun M. Abraham, Everett, WA (US)

(73) Assignee: Microsoft Corporation, Redmond, WA (US)

( * ) Notice: Subject to any disclaimer, the term of this patent is extended or adjusted under 35 U.S.C. 154(b) by 516 days.

(21) Appl. No.: 12/778,152

(22) Filed: May 12, 2010

(65) Prior Publication Data

US 2011/0283253 A1 Nov. 17, 2011

(51) Int. Cl.
*G06F 9/44* (2006.01)
*G06F 9/45* (2006.01)

(52) U.S. Cl.
USPC ........... 717/120; 717/108; 717/121; 717/140; 717/159

(58) Field of Classification Search
None
See application file for complete search history.

(56) References Cited

U.S. PATENT DOCUMENTS

| 6,968,544 | B1 * | 11/2005 | Schneider | 717/146 |
|---|---|---|---|---|
| 7,076,764 | B2 * | 7/2006 | Kramer | 717/120 |
| 8,028,269 | B2 * | 9/2011 | Bhatia et al. | 717/103 |
| 2003/0188299 | A1 * | 10/2003 | Broughton et al. | 717/141 |
| 2004/0015377 | A1 * | 1/2004 | Hostetler | 705/7 |
| 2004/0205508 | A1 * | 10/2004 | Wecker et al. | 715/501.1 |
| 2005/0015675 | A1 * | 1/2005 | Kolawa et al. | 714/38 |
| 2005/0183055 | A1 * | 8/2005 | Herrera | 716/17 |
| 2006/0229859 | A1 * | 10/2006 | Srouji et al. | 703/14 |
| 2007/0256058 | A1 * | 11/2007 | Marfatia et al. | 717/137 |
| 2008/0229292 | A1 * | 9/2008 | Matsa et al. | 717/141 |
| 2008/0294396 | A1 * | 11/2008 | Hsu et al. | 703/2 |
| 2009/0187879 | A1 * | 7/2009 | Ao et al. | 717/101 |
| 2009/0254877 | A1 * | 10/2009 | Kuriakose et al. | 717/105 |
| 2009/0300579 | A1 | 12/2009 | Dutta et al. | |
| 2010/0058338 | A1 * | 3/2010 | Schneider | 718/1 |

OTHER PUBLICATIONS

"Controlling Architecture with Structure101", Retrieved at <<http://www.headwaysoftware.com/products/structure101/ControllingArchitecturewithStructure101.pdf >>, White Paper, Jul. 2007, pp. 1-9.
Chock, Annamalai., "An Introduction to SonarJ for Eclipse", Retrieved at <<http://eclipse.dzone.com/articles/an-introduction-to-sonarj >>, Apr. 23, 2009, pp. 2.
Pagels, Randy., "A Sprint Around Visual Studio 2010 Ultimate", Retrieved at <<http://www.teamsystemcafe.net/files/Visual%20Studio%202010%20-%2030%20min-v6.pptx >>, Nov. 23, 2009, pp. 28.
"How to: Validate Code Against Layer Diagrams", Retrieved at <<http://msdn.microsoft.com/en-us/library/dd409395%28VS.100%29.aspx >>, Retrieved Date: Mar. 26, 2010, pp. 5.
Vohra, Deepak., "Validating XML Documents Against XML Schema", Retrieved at <<http://www.oracle.com/technology/pub/articles/vohra_xmlschema.html >>, Retrieved Date: Mar. 26, 2010, pp. 3.

* cited by examiner

*Primary Examiner* — Isaac Tecklu
(74) *Attorney, Agent, or Firm* — Carole Boelitz; Micky Minhas

(57) ABSTRACT

Architectural design intent for software is represented in some type of concrete form. A set of computable rules are inferred from the representation of the architectural design intent. The rules are applied to the codebase at various points in the development process including but not limited to when source code is checked into a project or when a build is run, or when a test run is performed. If the codebase being developed is not consistent with the architectural intent of the designer as captured, feedback concerning non-compliance is provided.

20 Claims, 5 Drawing Sheets

… (US 8,677,316 B2)

ENFORCEMENT OF ARCHITECTURAL DESIGN DURING SOFTWARE DEVELOPMENT

BACKGROUND

When a software project is contemplated, it is advisable for a software system architect or a software developer to design an architecture for the software system. Often this is done on a whiteboard and the architect hopes that the developers working on the project comply with his design. Often however, what actually happens is that in the flurry of activity involved in getting a product out, developers lose sight of the architectural design and code is produced that does not comply with the architect's design.

SUMMARY

A set of computable rules are extracted from an architectural design and/or from the codebase and are used during software development to determine if software being developed is consistent with the architectural intent of the designer as captured in some type of concrete form. At various points in the development process including but not limited to when source code is checked into a project, when a build is run, at test run, or when an application is instrumented during runtime, feedback concerning compliance or non-compliance of the source code to the architectural intent is provided.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
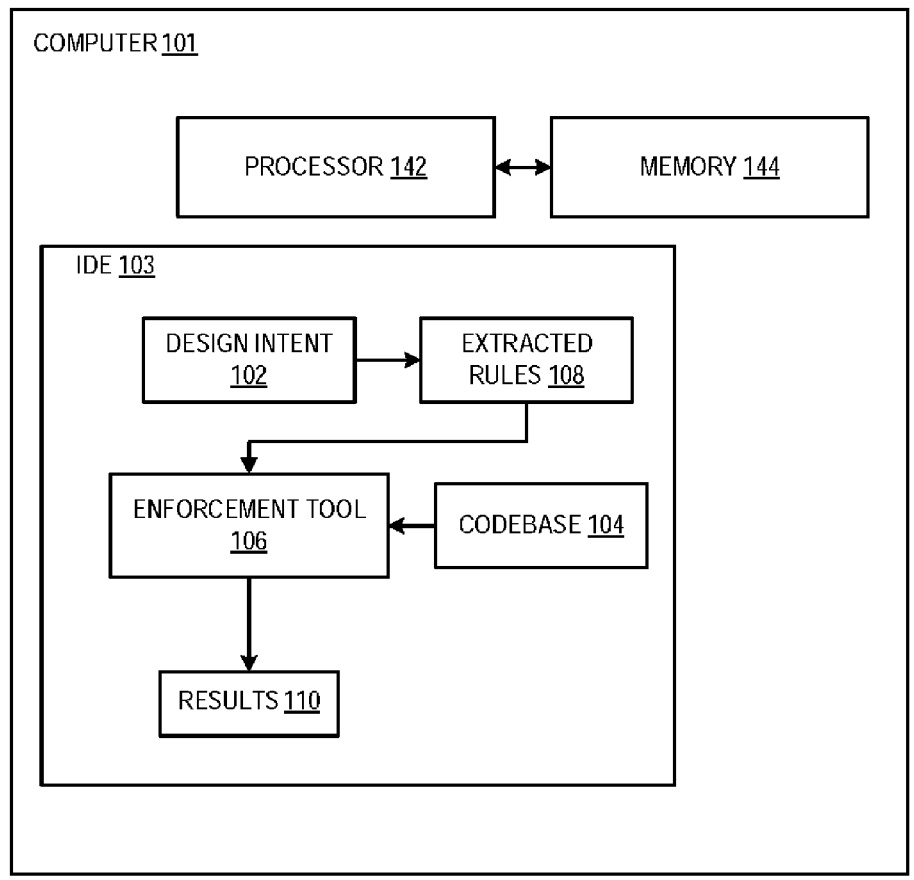
FIG. 1 is a block diagram of an example of a system for enforcement of architectural design during software development in accordance with aspects of the subject matter disclosed herein.
Figure 1:

As an architect or other user defines the architecture of a software system or application, rules implicit in the design are inferred and are defined in a way that allows the rules to be validated or checked. Rules can be defined explicitly as well. Rules can also be extracted from the codebase. The rules are enforced throughout the lifetime of development process for the software. Convenient enforcement opportunities include but are not limited to when checking source code in to a project, at test run, when a project is built and when an application is instrumented during runtime to provide additional data.

A logical architectural design for software can be defined by visual modeling. For example, one or more architecture diagrams can be created by an architecture design tool such as Microsoft's Visual Studio®, via formal modeling languages such as Unified Modeling Language (UML), Integration Definition Language (IDEF), System Modeling Language (SysML), Business Process Modeling Language (BPML), or other modeling languages or by using textual or visual domain specific languages. Architecture diagrams can include but are not limited to: use case diagrams, sequence diagrams, state machine diagrams, deployment diagrams, security diagrams, operational architecture diagrams, timing diagrams, collaboration diagrams, context diagrams, system diagrams, control flow diagrams, composite structure diagrams, object diagrams, package diagrams, communication diagrams, interaction overview diagrams, class diagrams, component diagrams, layer diagrams and activity diagrams. Physical artifacts in an existing application or software system can be associated or linked directly or indirectly with model elements represented in the architecture diagrams modeling a target logical architecture.

In accordance with aspects of the subject matter disclosed herein, the architectural diagram is converted to an intermediate format. Some or all of the source code belonging to the software under development is converted to the same intermediate format. The source code and compiled binaries can be inspected to determine the internal static structure and dependencies. Simulations can be run to determine the dynamic structures and dependencies. Other data sources including but not limited to execution trace logs and code coverage logs can be used to determine the structure and dependencies of the codebase. The results of the conversion of the source code and the results of the conversion of the architectural diagram can be merged and processed (analyzed) to produce results that provide an indication of whether or not the software tested for compliance complies or fails to comply with the architectural design or intent. The compliance results can be provided to a user. The compliance results can drive further actions, such as for example, in response to determining at check-in time that a particular portion of source code does not comply with the architectural intent, that portion of source code can be prevented from being checked in.

Enforcement of Architectural Design During Software Development

FIG. 1 illustrates an example of a system 100 for forcing software to comply with an architectural design over the development lifespan of the software in accordance with aspects of the subject matter disclosed herein. All or portions of system 100 may reside on one or more computers such as the computers described below with respect to FIG. 3. All or portions of system 100 may reside on one or more software development computers (e.g., computer 101) such as the computers described below with respect to FIG. 4. The system 100 or portions thereof may comprise a portion of an integrated development environment (e.g., IDE 103) such as the ones described and illustrated below with respect to FIG. 4. Alternatively, system 100 or portions thereof may be provided as a stand-alone system or as a plug-in or add-in.

System 100 may include one or more of: a processor (such as processor 142), a memory 144, and a module or modules (e.g., enforcement tool 106) that forces software to comply with an architectural design as described herein. Other components well known in the arts may also be included but are not here shown. For example, a model editor (not shown) for creating an architectural design representation of a design intent and a model store (not shown) for storing the design representation may also be included in system 100. It will be appreciated that the one or more modules of system 100 can be loaded into memory 144 to cause one or more processors such as processor 142 to perform the actions attributed to the module or modules for forcing software to comply with an architectural design. Moreover, the modules so described can ensure that software complies with the architectural intent over the development lifespan of the software.

System 100 may include one or more of the following: a design intent 102, an enforcement tool 106, a codebase 104, a set of extracted rules 108 and results 110. System 100 or portions thereof may reside on one or more computers connected via a network as described below with respect to FIG. 3. System 100 may comprise a portion of an integrated development environment such as the one described with respect to FIG. 4 or may be implemented as a stand-alone system or as a plug-in.

The design intent 102 can be any concrete representation of the design objectives and can be represented by architecture diagrams including but not limited to case diagrams, sequence diagrams, logical class diagrams, component diagrams, layer diagrams and activity diagrams. The architecture diagrams can be created with the help of an architecture design tool or can be created manually. The architecture diagrams can be visual models. For example, one or more architecture diagrams can be created by an architecture design tool such as Microsoft's Visual Studio®, via formal modeling languages such as Unified Modeling Language (UML), Integration Definition Language (IDEF), System Modeling Language (SysML), Business Process Modeling Language (BPML), or other modeling languages. The architecture intent can also be represented by a series of explicit statements that represent architectural rules.

The enforcement tool 106 may receive the codebase 104 and extracted rules 108. The codebase 104 and extracted rules 108 can be merged into an intermediate format. The set of extracted rules 108 or a portion thereof can be inferred from the design intent 102 and/or can be defined explicitly. The set of extracted rules 108 can be implicit in the design and can be defined in a way that allows the set of extracted rules to be validated or checked. The enforcement tool 106 may receive a codebase 104 that represents source code for a software system under development. The enforcement tool 106 can determine if the source code in the codebase 104 complies with the design intent 102 by applying the extracted rules 108 derived from the design intent to the software being checked for compliance with the architectural intent. The enforcement tool 106 can determine if the source code in the codebase 104 compiles with the design intent 102 by converting the codebase or a portion of the codebase to an intermediate language, converting the design intent 102 into the intermediate language, merging the intermediate language from the two sources and performing graph analysis on the merged intermediate language. The results of the graph analysis can be displayed to a user and can provide feedback concerning if the source code processed complies or does not comply with the architectural intent.

Examples of rules include but are not limited to:

"Component A cannot use or communicate with component B".

"Component A can use and can communicate with component C using the HTTP protocol and interface I."

Figure 2A:
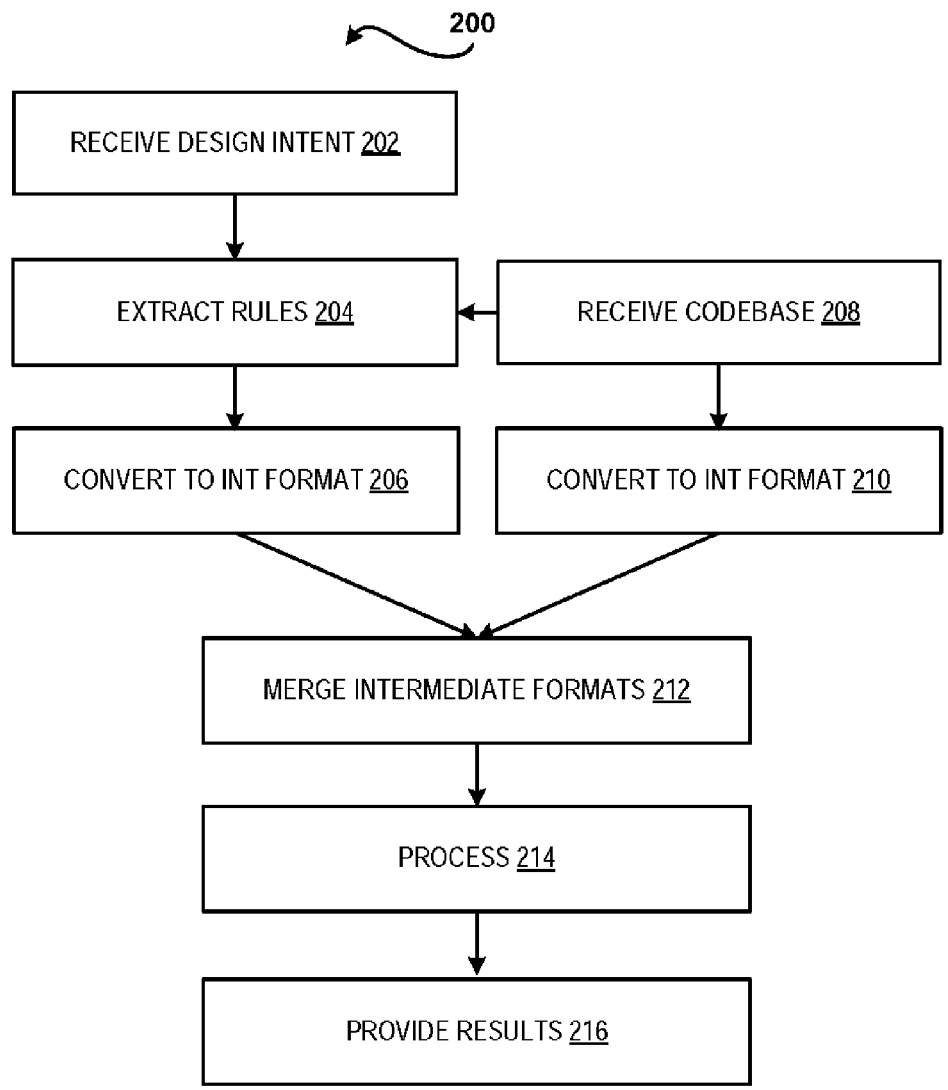
FIG. 2a is a flow diagram of an example of a method for enforcement of architectural design during software development in accordance with aspects of the subject matter disclosed herein.

FIG. 2a illustrates a method 200 for enforcement of design intent during software development. Some the steps can be optional or can occur in a different order than that illustrated in FIG. 2a. At 202 an enforcement tool can receive a design intent. The received design intent may comprise one or more diagrams or visual models including but not limited to case diagrams, sequence diagrams, logical class diagrams, component diagrams, layer diagrams and activity diagrams and so on. The design intent can be provided in any way that provides a concrete representation from which rules inherent or implied in the design can be inferred or extracted. Alternatively, or in addition, the design intent may be captured in a series of explicit rules such as but not limited to rules such as:

"Component A cannot use or communicate with component B".

"Component A can use and can communicate with component C using the HTTP protocol and interface I."

At 204 a set of rules that express the design intent can be inferred from the concrete representation of design intent. At 206 the enforcement tool can convert the extracted rules to an intermediate format. At 208 the enforcement tool can receive a codebase (entire or partial) and at 210 the enforcement tool can convert the received codebase or portion of the codebase into an intermediate format. The intermediate format for the source code can be the same intermediate format as that for the design intent. At 212 the intermediate format for the source code and the design intent can be merged. At 214 the merged intermediate format can be processed (via graph analysis). At 216 the results of the graph analysis can be presented to a user (e.g., software developer). Alternatively the results can be used to drive some other system action. For example, if the process described in FIG. 2a is performed at check in time and it is found that a piece of source code does not comply with the design intent, the source code check-in may fail. During build, errors, warnings or messages can be outputted.

Figure 2B:
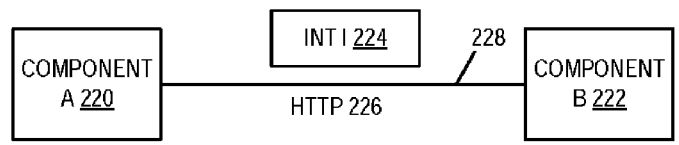
FIG. 2b is a block diagram of an example of a component diagram from which rules can be extracted in accordance with aspects of the subject matter disclosed herein.

FIG. 2b is an example of a visual model comprising a component diagram that represents architectural intent for some software system comprising a codebase such as codebase 104 of FIG. 1. Component A 220 may represent, for example, a consumer that consumes component B 222. Component B 222 may represent, for example, a web service. A line such as line 228 between component A 220 and component B 222 may indicate that component A 220 and component B 222 communicate with each other. Moreover, a description (HTTP 226) annotating or associated with the line 228 may indicate that the protocol used for communications between component A 220 and component B 222 is HTTP. Finally, an interface used by component A 220 and component B 222 to communicate may be indicated by interface I 224. The rules that can be inferred from this diagram can include the following:

Component A can communicate with Component B

Component B can communicate with Component A

Component A communicates with Component B using the HTTP protocol.

Component B communicates with Component A using the HTTP protocol.

Component A communicates with Component B via the Interface I interface.

Component B communicates with Component A via the Interface I interface.

A test can be inferred from the foregoing rules. For example, one possible test may create Component A, create Component B and verify that Component A and Component B can use the HTTP protocol, and using Interface I, Component A can communicate successfully with Component B and that Component B can return some result to Component A. The created test can be used, for example, at build time to verify that the architecture implied by the component diagram is complied with everywhere in the codebase for the application. The created test can be used, for example, at check in time to verify that the architecture implied by the component diagram is complied with by the source code being checked in to the project. The created test can be used, for example, at test run time to verify that the architecture implied by the component diagram is complied with by the source code being tested at test run time. Hence aspects of the subject matter described herein can be applied throughout the software development phase of an application or software system to ensure that the software being developed complies with the architectural intent, however expressed.

Figure 2C:
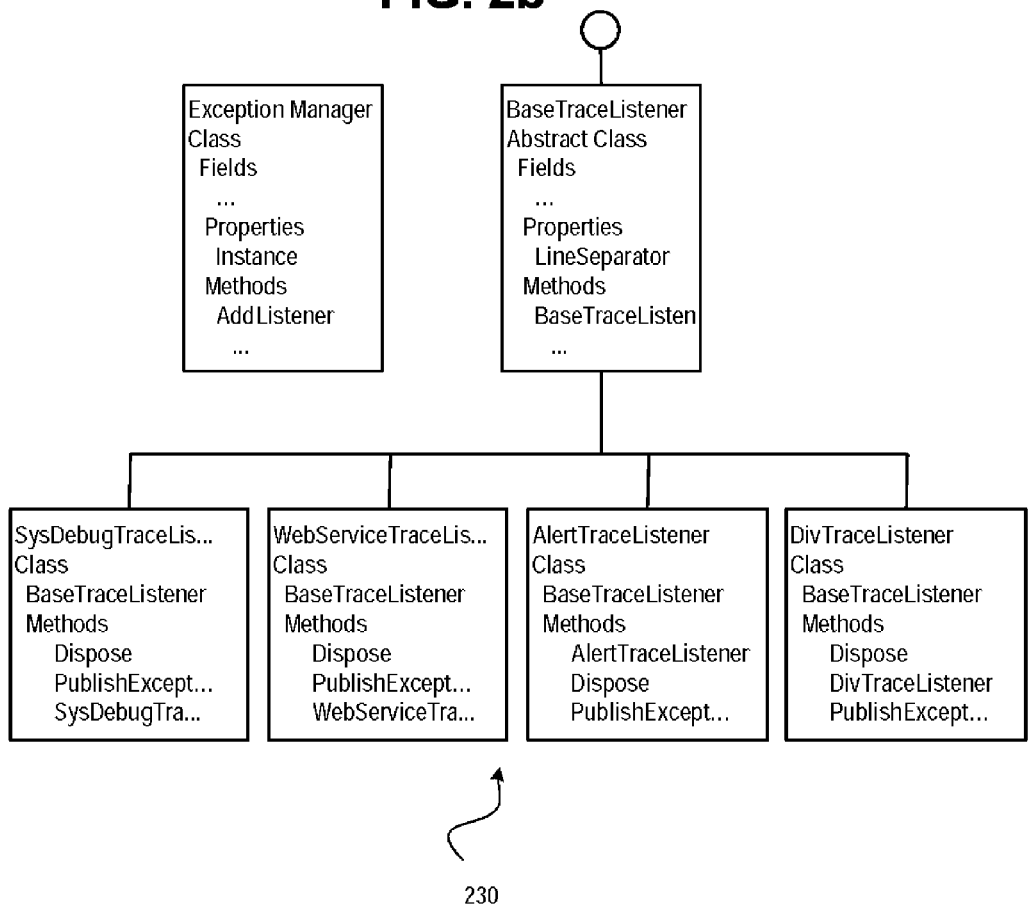
FIG. 2c is a block diagram of an example of a class diagram from which rules can be extracted in accordance with aspects of the subject matter disclosed herein.

Similarly, an architectural design intent for a set of classes can be specified using a class diagram that describes a desired pattern of class interaction. An example of a class diagram 230 is illustrated in FIG. 2c. A class diagram can specify the type of interaction between classes, (e.g., one class can use another class through a factory class). A class diagram can also specify an interface for the class and a concrete implementation of the interface. For example, a check out class can call an order submission strategy based on an order submission factory. The class diagram can be defined in a way that meets non-functional requirements. In the web service example described above, the definition of the class diagram can prevent, for example, an order strategy to be called up independently, instead, the rule extracted from the design intent represented by the class diagram can ensure or enforce that the order strategy is called up through an order submission factory.

Example of a Suitable Computing Environment

Figure 3:
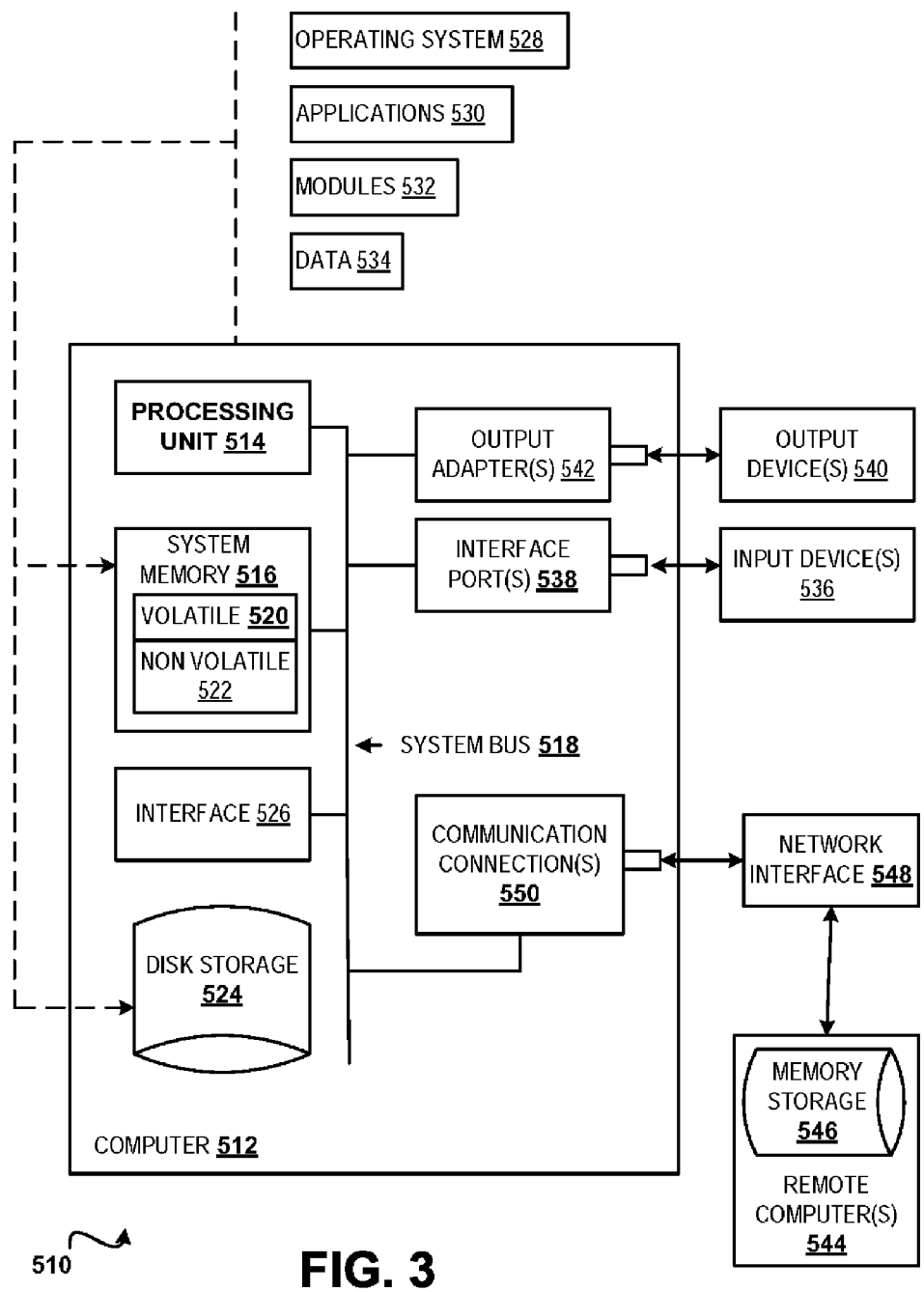
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a general purpose computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
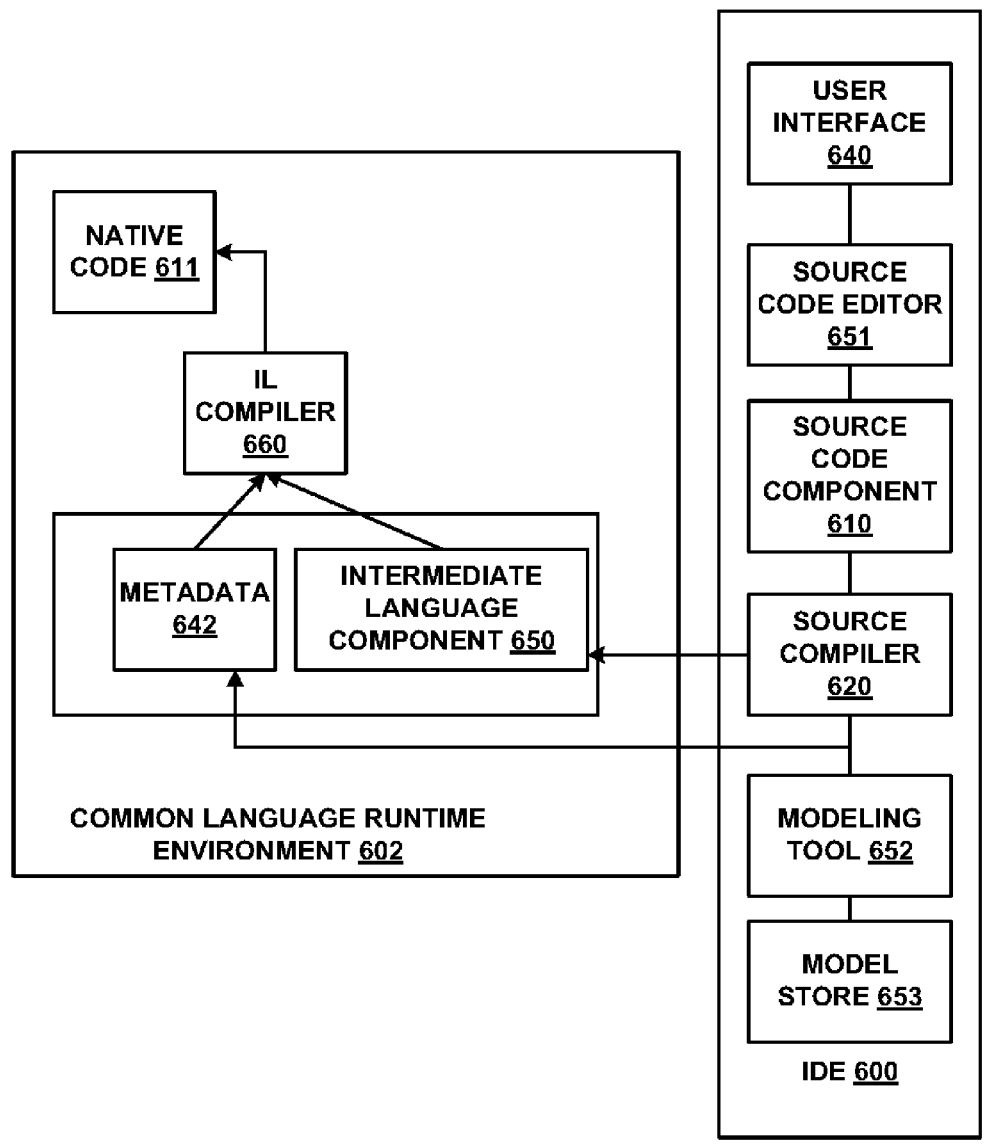
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code environment that runs on a virtual machine. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. A user can enter the intended architecture and/or rules for the architecture in a modeling tool 652 which can be stored in a model store 653. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system comprising:
a computer comprising a memory and a processor that are respectively configured to store and execute instructions, including instructions that are organized into:
a module configured to cause the processor to determine compliance of software with an architectural design by causing the processor to:
receive rules extracted from a design intent for the software, wherein the rules define at least a permissibility of communications between at least two components of the software;
merge the extracted rules with a codebase for the software, the codebase for the software including at least one static structure and at least one dynamic structure;
apply the extracted rules to at least a portion of the codebase via at least an inspection of the at least one static structure of the codebase and a simulation of the at least one dynamic structure of the codebase; and
provide an indication of whether the codebase is compliant with the extracted rules.

2. The system of claim 1, wherein the extracted rules are applied to at least the portion of the codebase at build time, at check in time, at test run time or when an application is instrumented during runtime.

3. The system of claim 1, wherein the design intent is represented by a visual model of the software.

4. The system of claim 3, wherein the visual model of the system comprises a use case diagram, a sequence diagram, a state machine diagram, a deployment diagram, a security diagram, an operational architecture diagram, a timing diagram, a collaboration diagram, a context diagram, a system diagram, a control flow diagram, a composite structure diagram, an object diagram, a package diagram, a communication diagram, an interaction overview diagram, a class diagram, a component diagram, a layer diagram or an activity diagram.

5. The system of claim 1, wherein the design intent is represented by a set of explicit rules.

6. The system of claim 1, wherein the module provides feedback associated with non-compliance of the software to the design intent.

7. The system of claim 1, wherein the module infers computable rules from the design intent.

8. A method, executed on a processor, of enforcing compliance of software with an architectural design comprising:
receiving rules extracted from a design intent for the software, wherein the rules define at least a permissibility of communications between at least two components of the software;
receiving a codebase for the software, the codebase for the software including at least one static structure and at least one dynamic structure;
applying the rules extracted from the design intent to at least a portion of the codebase via at least an inspection of the at least one static structure of the codebase and a simulation of the at least one dynamic structure of the codebase; and
providing, based on the application of the rules extracted from the design intent to at least the portion of the codebase, an indication of whether the codebase is compliant with the extracted rules.

9. The method of claim 8, further comprising:
inferring rules derived from a representation of the design intent to the portion of the codebase, the design intent comprising a visual model.

10. The method of claim 9, wherein the visual model comprises a use case diagram, a sequence diagram, a state machine diagram, a deployment diagram, a security diagram, an operational architecture diagram, a timing diagram, a collaboration diagram, a context diagram, a system diagram, a control flow diagram, a composite structure diagram, an object diagram, a package diagram, a communication diagram, an interaction overview diagram, a class diagram, a component diagram, a layer diagram or an activity diagram.

11. The method of claim 8, wherein applying the rules extracted from the design intent to at least a portion of the codebase includes applying the extracted rules at a build time, at a test run time, at a check in time or when an application is instrumented during runtime.

12. The method of claim 8, further comprising:
converting source code of the codebase to an intermediate format;
converting the rules to the intermediate format;
merging the converted source code and the converted rules;
analyzing the merged converted source code and rules; and
in response to analyzing the merged converted source code and rules, returning results comprising an indication of compliance or non-compliance of the source code to the design intent.

13. The method of claim 8, further comprising:
in response to applying rules extracted from the design intent to the portion of the codebase, determining that the portion fails to comply with the design intent; and
preventing check in of the portion of the codebase.

14. A computer storage medium, not comprising a signal per se, having computer-executable instructions stored therein for causing a processor to:
receive a representation of an architectural design intent for software under development;
infer rules from the received representation of the architectural design intent, wherein the rules define at least a permissibility of communications between at least two components of the software under development;
receive a codebase for the software, the codebase for the software including at least one static structure and at least one dynamic structure; and
apply the rules inferred from the architectural design intent to at least a portion of the codebase at at least one point of a plurality of points during the development of the software under development via at least an inspection of the at least one static structure of the codebase and a simulation of the at least one dynamic structure of the codebase.

15. The computer storage medium of claim 14, comprising further computer-executable instructions for causing the processor to:
convert source code of the codebase to an intermediate format;
convert the rules to the intermediate format;
merge the converted source code and the converted rules;
analyze the merged converted source code and rules; and
in response to analyzing the merged converted source code and rules, return a result comprising an indication of compliance or non-compliance of the source code to the architectural design intent.

16. The computer storage medium of claim 14, wherein the architectural design intent is represented by a visual model of the software.

17. The computer storage medium of claim 14, wherein the architectural design intent is represented by a visual model of the software, wherein the visual model of the software comprises at least one of a use case diagram, a sequence diagram, a state machine diagram, a deployment diagram, a security diagram, an operational architecture diagram, a timing diagram, a collaboration diagram, a context diagram, a system diagram, a control flow diagram, a composite structure diagram, an object diagram, a package diagram, a communication diagram, an interaction overview diagram, a class diagram, a component diagram, a layer diagram or an activity diagram.

18. The computer storage medium of claim 16, comprising further computer-executable instructions for causing the processor to:
apply the rules inferred from the architectural design intent to the portion of the codebase at a check in of the portion of the codebase.

19. The computer storage medium of claim 16, comprising further computer-executable instructions for causing the processor to:
apply the rules inferred from the architectural design intent to the codebase at a build time of the codebase; and
provide an indication of non-compliance of a portion of the codebase that fails to comply with the rules.

20. The computer storage medium of claim 16, comprising further computer-executable instructions for causing the processor to:
apply the rules inferred from the architectural design intent to the codebase at a test run of the codebase; and
provide an indication of non-compliance of a portion of the codebase that fails to comply with the rules.

* * * * *